United States Patent
McCormack et al.

(10) Patent No.: US 10,462,151 B2
(45) Date of Patent: Oct. 29, 2019

(54) TEMPORARY ACCESS OF A USER PROFILE

(71) Applicant: Avaya Inc., Santa Clara, CA (US)

(72) Inventors: Tony McCormack, Galway (IE); John H. Yoakum, Cary, NC (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/943,635

(22) Filed: Nov. 17, 2015

(65) Prior Publication Data

US 2017/0142128 A1 May 18, 2017

(51) Int. Cl.
*H04L 29/06* (2006.01)
*G06Q 50/00* (2012.01)

(52) U.S. Cl.
CPC .......... *H04L 63/108* (2013.01); *H04L 63/107* (2013.01); *G06Q 50/01* (2013.01); *H04L 63/102* (2013.01)

(58) Field of Classification Search
USPC .......................................................... 726/4
See application file for complete search history.

(56) References Cited

U.S. PATENT DOCUMENTS

| 8,224,351 | B1* | 7/2012 | Sushkov | G01S 5/02 455/456.1 |
|---|---|---|---|---|
| 2006/0095437 | A1* | 5/2006 | Bazot | G06Q 10/02 |
| 2011/0014897 | A1* | 1/2011 | Finucan | G06Q 10/10 455/412.2 |
| 2011/0138171 | A1* | 6/2011 | Yildiz | H04L 67/306 713/153 |
| 2012/0058775 | A1* | 3/2012 | Dupray | G01S 5/0257 455/456.1 |
| 2012/0143761 | A1* | 6/2012 | Doran | G06Q 20/08 705/44 |
| 2012/0303659 | A1* | 11/2012 | Erhart | H04L 29/12594 707/769 |
| 2013/0124628 | A1* | 5/2013 | Weerasinghe, Sr. | G06Q 30/0241 709/204 |
| 2014/0372753 | A1* | 12/2014 | DeCristofaro | G06F 21/6245 713/167 |

* cited by examiner

*Primary Examiner* — Harris C Wang (57) ABSTRACT

A user profile is temporarily accessed by an accessor. A method performed by the accessor of a contact center includes receiving access data. The access data includes a user identifier for a user, an identifier identifying a third party having profile data of the user, and a user-predefined condition which must be satisfied for the profile data to be temporarily accessible by the contact center. The method includes transmitting a request to the third party to temporarily access the profile data during a time period when the condition is satisfied, the request including the user identifier. The method includes temporarily accessing the user profile when the request is granted.

19 Claims, 6 Drawing Sheets

TEMPORARY ACCESS OF A USER PROFILE

BACKGROUND

A contact center may be used by a provider to enable a variety of services for a user. In a first example, the contact center may process a transaction in which information or a service may be provided for a user requesting the transaction. That is, the contact center may be configured as an inbound contact center that responds to product/service support and/or information requests from users. In a second example, the contact center may contact the user to provide information such as products or advertisements that may be of interest to the user. That is, the contact center may be configured as an outbound contact center that operates for purposes such as telemarketing, solicitation, debt collection, market research, etc.

The contact center may utilize any type of communication medium to perform its operations. For example, the contact center may be configured to perform voice communications, video communications, chat communications, email communications, etc. With regard to the inbound contact center, the user originates the communication and the agents of the contact center await for the incoming communication. With regard to the outbound contact center, the agents of the contact center may be provided with a list of users who are to receive a communication. The list of users may be generated in a variety of manners such as from a collection agency. However, in either scenario, the user and the contact center are generally separate parties.

The contact center may personalize any communication with the user through additional information. The additional information may be received via profile information associated with the user. The profile information may relate to any service or network in which the user is associated and includes relevant personal information. For example, the profile information may be accessed via a social network website. Due to privacy concerns, the profile access may be restricted to only enabled third parties as dictated by the user.

BRIEF SUMMARY

The exemplary embodiments are directed to a method, comprising: receiving, by an accessing device of a contact center, access data, the access data comprising a user identifier for a user, an identifier identifying a third party having profile data of the user, and a user-predefined condition which must be satisfied for the profile data to be temporarily accessible by the contact center; transmitting, by the accessing device, a request to the third party to temporarily access the profile data during a time period when the condition is satisfied, the request including the user identifier; and temporarily accessing, using the accessing device, the user profile when the request is granted.

The exemplary embodiments are directed to a method comprising: storing, in a data repository, a user-predefined condition which must be satisfied for profile data of a user to be temporarily accessible by an accessor; receiving, by a computing device, request data comprising a user identifier and a request to temporarily access the profile data of the user by the accessor; determining, by the computing device, if the user-predefined condition is satisfied during a time period to allow the temporary access to the profile data of the user by the accessor; and when the user predefined condition is satisfied, providing, by the computing device, the temporary access to the profile data during the time period.

The exemplary embodiments are directed to a method comprising: receiving, by an accessing device of a contact center, access data, the access data comprising a user identifier for a user, an identifier identifying a third party having profile data of the user, and a user-predefined condition which must be satisfied for the profile data to be temporarily accessibly by the contact center; transmitting, by the accessing device, a request to the third party for a permission grant token to temporarily access the profile data during a time period when the condition is satisfied, the request including the user identifier; receiving, using the access device, a response to the request from the third party, the response including the permission grant token to access the user profile during the time period; and with the permission grant token, temporarily accessing, using the access device, the user profile.

DETAILED DESCRIPTION

The exemplary embodiments may be further understood with reference to the following description and the related appended drawings, wherein like elements are provided with the same reference numerals. The exemplary embodiments are related to a device, a system, and a method for utilizing a temporary access (or a situational grant) to a profile of a user. In a first aspect, the user may determine when the temporary access is to be used based upon criteria associated with the user. In a second aspect, an accessor may receive the temporary access to the profile while the criteria are being met. The temporary access, the profile information, the mechanisms, the user and the accessor, and related methods will be described in further detail below.

The exemplary embodiments are configured to enable an accessor to access a user profile or profile information of a user based upon a situational and/or temporary basis. The accessor may be one or more individuals and/or entities such as a contact center, a business, other users sharing a common attribute with the user, etc. Thus, the exemplary embodiments provide a mechanism whereby a user (e.g., a customer of the contact center) provides information that is used to authorize the temporary access to the user's profile information by the accessor (e.g., the social network). It is noted that the exemplary embodiments described herein relate to a use case with a contact center. However, those skilled in the art will understand that the exemplary embodiments may be applied to any system in which a user may provide temporary access to an accessor. Thus, the contact center used herein may represent any of these accessors where the accessors may be individuals and/or entities such as contact centers.

Figure 1:
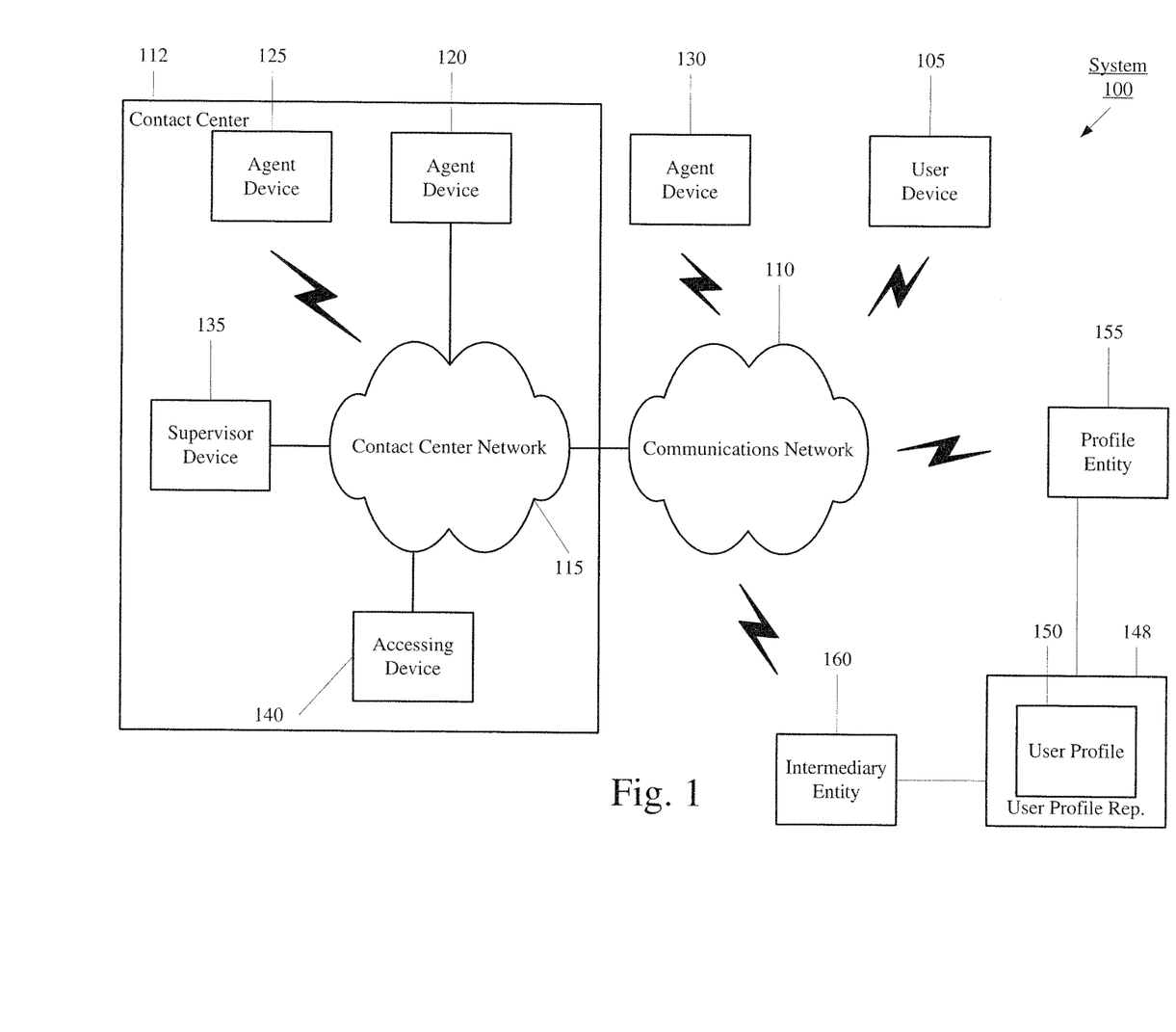
FIG. 1 shows an exemplary contact center system according to the present disclosure.

FIG. 1 shows an exemplary embodiment of a system 100 including a contact center 112 and channels for a user to communicate with the contact center 112. The system 100 may include a communications network 110 and a contact center communications network 115 which are communicatively connected to one another. Accordingly, a user device 105 connected to the communications network 110 may communicate with the contact center 112. The system 100 may enable the user device 105 utilized by a user to perform a transaction via the communications network 110 and the contact center network 115 to an agent device 120 utilized by an agent so that a communication channel may be established therebetween in real-time or non-real-time for the transaction to be processed. That is, the transaction may relate to an inbound transaction originating from the user device 105 or an outbound transaction originating from the contact center 112. As will be described in further detail below, the system 100 may further include an accessing device 140, a user profile repository 148 including a user profile 150, a profile entity 155, and, optionally, an intermediary entity 160.

Figure 2:
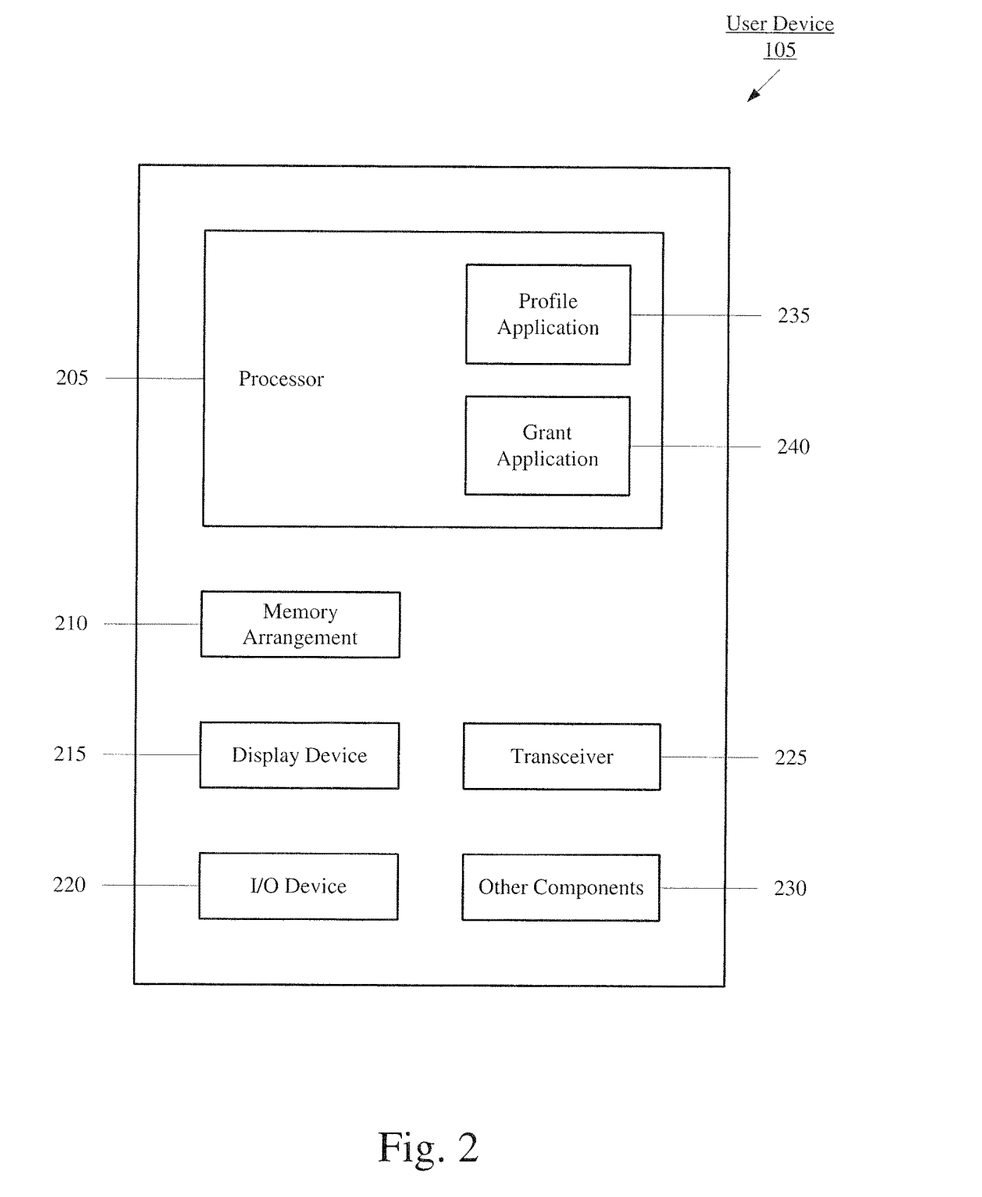
FIG. 2 shows an exemplary user device of FIG. 1 according to the present disclosure.

FIG. 2 shows an exemplary embodiment of the user device 105 shown in FIG. 1. As noted above, the user device 105 may be utilized in a first aspect of the exemplary embodiments in which information is provided to define the temporary access including the conditions upon which the temporary access is valid and may be used to access the user profile 150. For example, the temporary access may be embodied in access data. The user device 105 may represent any electronic device that is configured to perform the functionalities described herein. For example, the user device 105 may be a portable device such as a tablet, a smartphone, a laptop, etc. In another example, the user device 105 may be a stationary device such as a desktop terminal. The user device 105 may include a processor 205, a memory arrangement 210, a display device 215, an I/O device 220, a transceiver 225, and other components 230 (e.g., an imager, an audio input device (for use during the voice or video communication), an audio output device (for use during the voice or video communication), a battery, a data acquisition device, ports to electrically connect the user device 105 to other electronic devices, etc.).

The processor 205 may be configured to execute a plurality of applications of the user device 105. For example, the processor 205 may execute a web browser when connected to the communications network 110 via the transceiver 225. In another example, the processor 205 may execute a communications functionality such as a call application (e.g., to establish a voice communication), a chat application (e.g., to establish a chat communication), a video application (e.g., to establish a video communication, etc. when processing a transaction between the contact center 112 and the user device 105. This communication functionality may also be used when communicating with other user devices. In a further example, the processor 205 may execute a profile application 235. As will be described in further detail below, the profile application 235 may be configured to access the user profile 150 associated with a user profile arrangement such as used in the user profile repository 148. The user profile arrangement will be described in further detail below as well. In yet another example, the processor 205 may execute a grant application 240. As will be described in further detail below, the grant application 240 may be used with the profile application 235 in generating the access data.

It should be noted that the above noted applications each being an application (e.g., a program) executed by the processor 205 is only exemplary. The functionality associated with the applications may also be represented as components of one or more multifunctional programs, a separate incorporated component of the user device 105 or may be a modular component coupled to the user device 105, e.g., an integrated circuit with or without firmware.

The memory 210 may be a hardware component configured to store data related to operations performed by the user device 105. Specifically, the memory 210 may store data related to the profile application 235 and the grant application 240. For example, the grant application 240 may include criteria for different user profile arrangements for which temporary access is provided. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data, particularly related to processing the transaction using a real-time communication. That is, the transceiver 225 may enable the communication with other electronic devices directly or indirectly through a network based upon an operating frequency of the network. The transceiver 225 may operate on a variety of different frequencies or channels (e.g., set of consecutive frequencies) that are related to the functionalities of the different applications being performed.

Returning to the system 100 of FIG. 1, the communications network 110 may represent any single or plurality of networks used by the user device 105 to communicate with the contact center 112 via the contact center network 115 and/or with the user profile 150. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The communications network 110 may also represent one or more networks that are configured to connect to one another to enable the data to be exchanged among the components of the system 100.

The contact center network 115 of the contact center 112 may enable a plurality of devices to be interconnected with one another. For example, the contact center network 115 may be a proprietary network accessible in one manner by the agent devices 120-130, the supervisor device 135, and the monitoring device 140. Specifically, the agent devices 120-130, the supervisor device 135, and the accessing device 140 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data, particularly using the video communication.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network 115 may include a server, a router, a switch center, a network management arrangement, a database, etc. It should also be noted that the use of three agent devices 120-130 is only exemplary. Those skilled in the art will understand that the contact center may utilize any number of agent devices. It should further be noted that the use of one supervisor device 135 is only exemplary. Those skilled in the art will understand that the contact center may utilize any number of supervisor devices to manage one or more agent devices.

As will be described in further detail below, the contact center network 115 may also be utilized by the contact center 112 to establish a connection with the user profile 150 via the communications network 110. Specifically, when temporary access has been granted and so long as the access is granted, the contact center 112 and its agents via the agent devices 120-130 may utilize and access the user profile 150 on the user profile arrangement for which the temporary access has been granted.

The different components used by users of the contact center 112 may include the agent devices 120-130 and the supervisor device 135. The agent devices 120-130 may be utilized by respective agents to process a transaction. The agent may subsequently use a process to determine a response or resolution for the transaction. The agent devices 120-130 may also be utilized by the agents in functionalities related to the situation grant to the user profile 150. The supervisor device 135 may be utilized by a supervisor who is responsible for a plurality of agents such as those using the agent devices 120-130. The supervisor may be configured to monitor the actions performed by the agents as well as the processing of the transactions.

Initially, as discussed above, the user device 105 may also be used to process a transaction with the contact center 112 as the user device 105 is an electronic device in which a user may perform a transaction with the contact center 112. The transaction and its resolution may be performed over non-real-time communications (e.g., an email, a form communication, etc.) or real-time communications (e.g., a chat communication, a voice communication, a video communication, etc.). The user device 105 is shown as wirelessly communicating with the communications network 110. However, it should be noted that the user device 105 may also connect to the communications network 110 using other means such as a wired connection. Accordingly, the user device 105 may include corresponding components to enter information for the transaction (e.g., an input/output (I/O) device), to connect to the communications network 110 (e.g., a transceiver), to transmit the transaction, to perform the transaction (e.g., an imager), etc.

According to the exemplary embodiments, the first aspect may relate to the temporary access being provided and the conditions upon which the temporary access grant data representing the situational grant is provided. As discussed above, the profile application 235 may be used to access the user profile 150 associated with the user profile arrangement. The user profile arrangement may be any entity, organization, website, storage, etc. in which the user profile 150 of the user is associated or used. As illustrated in the system 100 of FIG. 1, the user profile arrangement may be embodied as a profile entity 155. It is noted that the profile entity 155 may be arranged substantially similar to the contact center 112. Specifically, the profile entity 155 may include a plurality of components and may include a profile network that is substantially similar to the operations and features provided by the contact center network 115. The user profile 150 may be determined in a variety of manners.

In a first example, the profile entity 155 may be a website. For example, the website may be a social networking website. Accordingly, a social networking website may allow the user to create the social networking webpages. The social networking website may allow a user to post information including media such as photos and videos and update statuses (hereinafter collectively referred to as "items") for members within the social network of the user to view. The members of the social network of the user may be categorized in a plurality of groups. For example, a first set of items may be accessible by anyone visiting the social networking website of the user, while a second set of items may be accessible by selected members visiting the social networking website who have been given a specialized status (e.g., categorized as "friends" of the user). The social networking website may enable the user to also show information related to the user profile 150 of the user including personal information such as biographical data and other information such as interests and hobbies of the user. The information of the user profile 150 may have been entered upon creation of the social networking website and subsequently updated by the user. The information of the user profile 150 may also be viewed based upon a substantially similar standard as the items. However, the user may selectively restrict who may access the user profile 150 such as only those designated as friends. In this manner, the user profile 150 may be associated with the user and the user device 105 via the profile entity 155 being a website. More specifically, this example may illustrate one manner in which the information of the user profile 150 is provided manually by the user. It should be noted that the profile entity 155 being a website is only exemplary. That is, the website may represent other electronic formats such as a mobile application.

In a second example, the profile entity 155 may be an organization providing a feature for the user. For example, the organization may utilize a proprietary application such as a mobile device application. The feature provided by the organization may be an outlet in which items of interest to the user may be shown for others on a personalized display.

Accordingly, the mobile device application may be used by the user to select items (e.g., on other personalized displays of other users, from a website, etc.) and re-post the selected items on the personalized display of the user. In a substantially similar manner as the website, the user may select the manner in which others are allowed to access the personalized display such as those who are authorized (e.g., manually accepted by the user upon receipt of a request). It should be noted that the personalized display may also be embodied or shown as a website if the organization also provides this feature. In this manner, the user profile 150 may be associated with the user and the user device 105 via the profile entity 155 being an organization. More specifically, this example may illustrate one manner in which the information of the user profile 150 may be determined through the manual selections of the user.

In a third example, the profile entity 155 may be any other entity or storage (hereinafter collectively referred to as "other entity") related to using the user profile 150. For example, the other entity may be a banking, loan, or other monetary entity that tracks spending habits of the user. In another example, the other entity may be a geolocation tracking entity of the user. In a further example, the other entity may be a collection organization that generates data of the user by collecting data related to the user from various sources. The other entities may receive this data and determine the user profile 150 of the user. In contrast to the manual selection of the user in accessing the user profile 150 in the above examples, access to this user profile 150 of the other entity may be based upon different standards although ultimately under the control of the user. For example, the user may enable the other entity to grant access, as a condition of using the service provided by the other entity. In another example, the user may enable the other entity to restrict access unless otherwise indicated by the user. In this manner, the user profile 150 may be associated with the user and the user device 105 via the profile entity 155 being an other entity. More specifically, this example may illustrate one manner in which the information of the user profile 150 is determined inferentially without direct user intervention.

The above describes various ways for the user profile 150 to be generated and accessed through a manual control. As discussed above, the grant application 240 may be used to configure the access data for the contact center 112 to access the user profile 150. That is, the access data may be a mechanism beyond the manual access control that provides the conventional grant. The access data may differ from the manual grant in a variety of ways. For example, the manual grant may be a permanent grant until the user manually changes the grant, often in an on/off manner so that the manual grant is either awarded or denied. The access data representing the temporary access may be a temporary grant where the user grants the temporary access to the user information 150 for a predetermined time and/or until a predetermined event. That is, the temporary access for the contact center 112 may not be permanent and may not require the user to perform additional actions to later deny or end the access. In fact, as will be described in further detail below, the user may also not be required to perform actions in granting the access but only provide the information that determines whether the temporary access is to be granted. In another example, the manual grant may be provided when (and only when) a request for the grant is received. Thus, in the example of the website, a potential friend may transmit a request to become an authorized member who is able to access the user profile 150. In contrast, the temporary access may provide access to the user profile 150 when criteria are met. That is, the situational grant may not rely upon a person having to contact the user. Instead, the user may set the criteria such that any person who satisfies the criteria are provided the situational grant. In this manner, the situational grant may originate from the user.

As discussed above, the access data may be time and/or criteria based. That is, the access data may include a time frame data and a criteria data. The access data, the time frame data, and the criteria data may be used in defining the temporary access. Thus, the access data may be used in a variety of manners and provided in a variety of manners as well. For example, the access data may be manually provided and/or manually set to be provided such that a subsequent determination awards the temporary access. As will be described in further detail below, the access data may be provided through a token, a criteria based award, and a common parameter based award. However, it should be noted that these manners of providing the access data are only exemplary and any manner of performing this functionality may be used.

Initially, as discussed above, the grant application 240 may be used with the profile application 235 in defining the temporary access. The grant application 240 may specifically be used with the profile entity 155. For example, when the profile entity 155 is a website, a settings page may be provided that enables the user to enter information (via the I/O device 22) that defines the temporary access as embodied in the access data. Specifically, the user may provide information corresponding to the time frame data and the criteria data. The profile entity 155 may store this information and associate the information with the user profile 150 stored in the user profile repository 148.

The grant application 240 may also be used in providing information to the accessor. Specifically, the grant application 240 may provide the access data to the accessor where the access data provided in this instance also includes further identifying information. Specifically, the accessor may receive the access data from the user device 105 including the time frame data and the criteria data to determine when the access data is valid for use in accessing the user profile 150. The identifying information that is included in the access data may include a user identifier of the user and a further identifier identifying a third party having the user profile 150. Specifically, the further identifier may be a profile entity identifier. In this manner, the accessor may determine the route required to access the user profile 150 (e.g., utilizing the website of the profile entity 155 and the user identifier on this website).

It should be noted that the exemplary embodiments described herein relate to the user profile repository 148 storing the profile entity 155 being associated with the profile entity 155. For example, the profile entity 155 may be a storage component used by the profile entity 155 that may also utilize authorization features to enable only the profile entity 155 to access the user profile repository 148. As shown, the profile entity 155 may have a wired connection to the user profile repository 148. However, in another exemplary embodiment, the user profile repository 148 may also be accessible using a wireless connection through a proprietary network of the profile entity 155. In a further exemplary embodiment, the user profile repository 148 may be provided by a further entity for data to be stored. The profile entity 155 may utilize a pre-arranged accessing functionality in such a scenario. As will be described in further detail below, the exemplary embodiments are described with regard to the profile entity 155 performing the operations of determining an enabling the temporary access.

It should also be noted that the exemplary embodiments described herein relate to the profile entity 155 performing the operations described herein such as receiving the time frame data and the criteria data from the user device 105 to define how the situational grant is to be used as well as the determining of when the temporary access is to be used. However, this is only exemplary. The exemplary embodiments may also, optionally, utilize the intermediary entity 160 that receives the access data from the user device 105. The intermediary entity 160 may be, for example, a broker entity that performs the operations described herein on behalf of the profile entity 155. As the user profile repository 148 is associated with the profile entity 155 (i.e., not associated with the intermediary entity 160), the access data including the time frame data and the criteria data may be provided to the intermediary entity 160 by the user device 105 with the above described further identifying information. The intermediary entity 160 may also have access to the user profile repository 148 such that the determination of enabling the temporary access (as will be described in further detail below) may be performed by the intermediary entity 160. The intermediary entity 160 is shown as having a wired connection to the user profile repository 148 but may have a wireless connection thereto. Accordingly, the user profile repository 148 may have a connection to the communications network 110 and the intermediary entity 160 may access the user profile repository 148 via the communications network 110. To be granted access to using the user profile repository 148, a preexisting relationship may be established with the profile entity 155 that enables the intermediary entity 160 to perform the operations described herein related to the situational grant. When using the intermediary entity 160, the access data including the further identifying information being received from the user device 105 may also include an accessor identifier that indicates whether an access that is requesting the situational grant is a verified accessor.

In a first example of using the temporary access, the access data may be used to generate a permission grant token. The token may represent a form in which the access data is provided to the accessor. Therefore, the accessor such as the contact center 112 may transmit a request for the temporary access to the profile entity 155 (e.g., as identified by the further identifier of the third party from the access data received from the user device 105) by transmitting a request including the identifying information (e.g., user identifier as is also received from the user device 105). In response to this request and after verifying whether the temporary access is to be provided, the profile entity 155 may return the token that may be used to temporarily access the user profile 150 corresponding to the user identifier. The token may be any object or data that enables a right to perform an operation which, in this case, may be the temporary access of the user profile 150.

In a second example of using the temporary access, the access data may be used to set criteria (as defined in the criteria data) in which the access data is to be used for the temporary access. The criteria may represent one or more conditions (e.g., events) that must occur for the access data to become valid in accessing the user profile 150. The criteria data may be provided to the contact center 112 in a variety of ways. For example, the criteria may be provided to the contact center 112 directly (e.g., the access data). In another example, the criteria may be transmitted through intermediaries such as the user profile arrangement. In a further example, the criteria may be selected by the user and provided to the contact center 112. In yet another example, the criteria may be predetermined such as by the user profile arrangement and authorized by the user. It is noted that the criteria data and the time frame data may be independent factors or may be tied to one another. For example, the time frame data may be defined as predetermined times including a predetermined start time (e.g., 3:00 pm or a specific date) and a predetermined end time (e.g., 8:00 pm or a specific date). In another example, the time frame data may be open-ended including an open-ended start time (e.g., when condition A is satisfied) and an open-ended end time (e.g., when condition A is no longer satisfied).

In a first example of using criteria for the temporary access, the criteria may be location based. The location based criteria may relate to a geolocation of the user device 105. Specifically, the user may enter the criteria in a predetermined manner such that when the geolocation of the user device 105 is determined to satisfy the location based criteria, the temporary access is valid for the contact center. In a specific example, the location based criteria may be set such that when the user device 105 is determined to be in an airport and/or in flight, the contact center 112 may have the temporary access. In this manner, the location of the user device 105 provides a first basis in which the temporary access is to be used. The temporary access is associated with a time duration in which the user device 105 is located in the airport and/or in flight. Accordingly, how long the user device 105 is determined to satisfy the criteria provides a second basis in which the temporary access is to be used. That is, the duration of the temporary access may be predetermined based upon a value that may be entered or dynamic based upon a determination or monitoring operation. It should be noted that the geolocation of the user device 105 is only exemplary. In another example, the location based criteria a virtual location (e.g., a chat room), an intended location (e.g., expected location), etc.

In a second example of using criteria for the temporary access, the criteria may be based upon a common parameter with the user device 105. That is, the criteria may be based upon further considerations beyond parameters of only the user device 105. Accordingly, when the user device 105 has a parameter and another accessor (e.g., another user device) or the contact center 112 shares the parameter, the criteria may indicate that the accessor/contact center 112 is provided the temporary access to the user profile 150. In a first specific example, the contact center 112 may have different geographic locations in which the user with the user device 105 may visit. While the user device 105 is present within the contact center 112, the contact center 112 may be provided the temporary access. That is, the location may be the parameter and the contact center and the user device 105 share this location parameter. In a second specific example, the criteria may be further defined such that the location is a first criteria and a shared characteristic is a second criteria such as the purpose for being in the location. Thus, when the user with the user device 105 is at a concert and a second user with a second user device is also at the concert, the temporary access may be provided to the second user device.

In a particular embodiment with regard to the contact center 112, the contact center 112 may utilize the access data based upon operations associated with the contact center 112. For example, when the user device 105 is used in processing a transaction with the contact center 112, the contact center 112 may be provided the access data including the time frame data, the criteria data, and the further identifying information. Thus, the contact center 112 may determine that the time frame data and the criteria data are satisfied, the identifying information may be used to use the situational grant of accessing the user profile 150. Specifically, the identifying information may be used to identify the profile entity 155 and transmit a request to access the user profile 150. The profile entity 155 may enable the temporary access (e.g., providing a token) such that the contact center 112 accesses the user profile 150 for a time period as defined by the time frame data. More specifically, when the transaction is performed in real-time such as with a voice communication, video communication, chat communication, etc., the time frame data of the situational grant may endure until the communication is concluded such that the start time may be when the communication starts and the end time may be when the communication ends. When the transaction is performed in non-real-time such as with email, the temporary access may endure from the contact center 112 receiving the request for the transaction until a response has been provided back to the user device 105. In this manner, the temporary access may be used by the contact center 112 to access the user profile 150.

It should be noted that the access data may include further features or operations. Specifically, the temporary access associated with the access data may be performed in stages. For example, the social networking website (e.g., the profile entity 155) illustrates how a token may be used as the means for providing the temporary access. That is, the contact center 112 may also have its own social networking website, both of the social networking website organized by a common user profile arrangement. The token may be provided such that the contact center 112 may access the user profile 150 through the social networking website of the user. However, another manner of providing the temporary access may be through criteria. Specifically, an initial indication may be provided for the user profile arrangement such as the user "liking" the social networking website of the contact center 112. This may enable the contact center 112 to further be provided the situational grant when further criteria are met. That is, this may be an initial authorization for the contact center 112 to access the user profile 150 by indicating that the contact center 112 is an authorized accessor via the grant of the temporary access. When the further criteria are subsequently met and for each time the further criteria is met, the contact center 112 may be provided the temporary access during the time the criteria is being met. For example, the user may post that the user is flying to a location. The criteria may be that for two hours prior to the flight (while in the airport) until one hour after the flight has landed (while in the airport), the contact center 112 may access the user profile 150. The initial authorization may thereby provide the contact center 112 with a capability of tracking the flight information to determine whether the temporary access is valid.

It should also be noted that the use of access data including at least one aspect that is manually performed (e.g., entering the time frame data and the criteria data) is only exemplary. Although the above description relates to the grant application 240 of the user device 105 being used, the exemplary embodiments may also be utilized in a passive manner without user intervention. For example, the exemplary embodiments may also utilize a mechanism where use of the profile application 235 may result in various authorizations and indications for the contact center 112 including settings sent to the user profile arrangement, actions taken on the user profile arrangement, etc. This may result in triggering the temporary access without any user intervention. That is, the operation may not necessarily be performed on the user device 105 but is at least associated with the user device 105.

Figure 3:
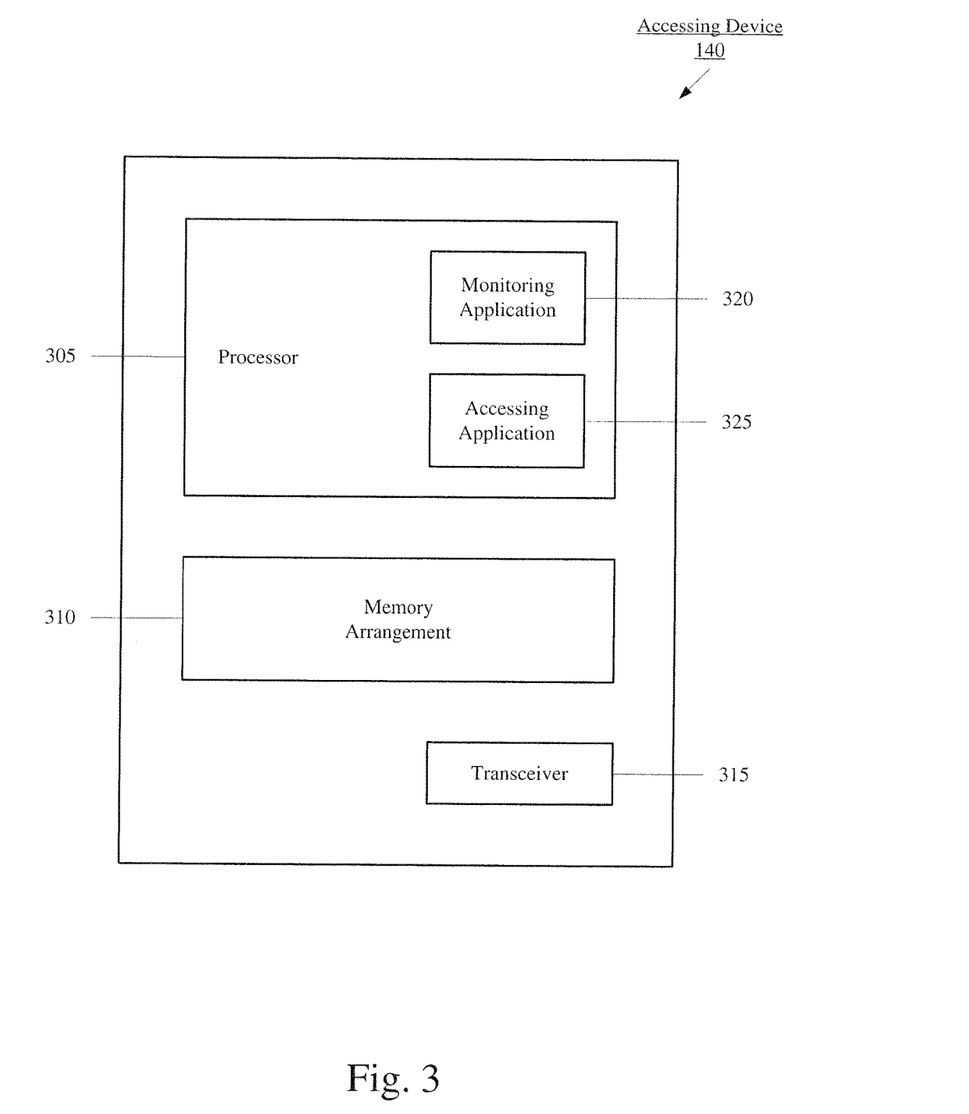
FIG. 3 shows an exemplary accessing device of the contact center system of FIG. 1 according to the present disclosure.

Returning to the system 100 of FIG. 1, the contact center 112 may also include the accessing device 140. FIG. 3 shows the exemplary accessing device 140 of the contact center 112 in the system 100 of FIG. 1. The accessing device 140 may provide a mechanism by which the temporary access is determined and utilized by the contact center 112 and its agents. Specifically, the accessing device 140 may determine when the temporary access is authorized and/or valid such as when criteria must be met prior to the temporary access being valid. In addition, the accessing device 140 may determine the third party or the profile entity 155 that has the user profile 150. Furthermore, the accessing device 140 may control a manner in which the contact center 112 and/or the agent devices 120-130 are to utilize the temporary access. For example, the accessing device 140 may provide a notification to the agent devices 120-130 that the temporary access to the user profile 150 is currently valid and provide further information such as the duration or predicted duration for which the access is likely to be granted.

The accessing device 140 may represent any electronic device that is configured to perform the functionalities described herein. The accessing device 140 may include a processor 305, a memory arrangement 310, and a transceiver 315 that provide functionalities substantially similar to those described above with regard to the user device 105. It should be noted that the accessing device 140 may also include further components such as a display device and an I/O device that enable the administrator to configure the accessing device 140 to perform its intended functionalities. However, it should also be noted that the accessing device 140 may be configured to receive these instructions via the transceiver 315 to automatically implement the policies upon reception.

It should again be noted that the accessing device 140 being a component of the contact center 112 is only exemplary. As noted above, the functionalities described herein for the accessing device 140 may be performed by any device. Thus, if the accessor that is accessing the user profile 150 is the contact center 112, the accessing device 140 or any other device of the contact center 112 such as the agent devices 120-130 may perform the functionalities of the accessing device 140. If the agent devices 120-130 were to perform these functionalities, the accessing device 140 or the functionalities thereof may be incorporated into the agent devices 120-130. Furthermore, the accessor may be a further user device. In such an embodiment, the functionalities of the accessing device 140 may be incorporated into the further user device. It is further noted that the use of the contact center 112 is only exemplary. The contact center 112 may represent any accessor of the user profile 150, while the temporary access is being used for such purpose. In further exemplary embodiments, the accessor may be a business (e.g., an airline) that requests the temporary access. However, those skilled in the art will understand that the business may also have its own contact center 112.

The processor 305 may be configured to execute a monitoring application 320. The monitoring application 320 may be used for different operations. In a first example, the monitoring application 320 may be used to receive the access data from the user device 105. Accordingly, the monitoring application 320 may determine the time frame data and the criteria data to determine when a situational grant may be used to access the user profile 150. In a second example, the monitoring application 320 may be used for operations based upon the types of ways the temporary access is provided. For example, when the temporary access is transmitted to the contact center 112 from the profile entity 155 (after a request has been transmitted) such as in the form of a token, the monitoring application 320 may determine when this token is received. In another example, when the temporary access is determined based upon criteria, the monitoring application 320 may determine when the criteria have been met such as from receiving or determining information corresponding to the user device 105 (e.g., a location).

With particular regard to the temporary access based upon meeting criteria (including when associated with the token), the monitoring application 320 may continuously monitor when the criteria is being met. For example, when the criteria is location based, the monitoring application 320 may determine the location of the user device 105 and/or receive information related to the location of the user device 105. Therefore, the monitoring application 320 may determine when the location based criteria continues to be met such that the temporary access remains valid. The monitoring application 320 may utilize any information or determine itself whether the temporary access is valid based upon the criteria using any mechanism. In this manner, the monitoring application 320 may generate the signal for which the temporary access is valid to be properly processed and provided such as to the accessing application 325. The monitoring application 320 may also generate an accessible time frame upon which the temporary access may be used in accessing the user profile 150.

The processor 305 may also be configured to execute the accessing application 325. The accessing application 325 may be configured to utilize the temporary access. The monitoring application 320 may determine when the temporary access is valid and may also provide further information corresponding to the temporary access such as the user of the user device 105 (as determined by the monitoring application 320), the time period for which the temporary access is valid or expected to be valid (as determined by the monitoring application 320), a respective user profile arrangement associated with the user profile 150, etc. Thus, when the accessing application 325 is forwarded this information such as the accessible time frame, the accessing application 325 may perform subsequent operations.

In a first example, the accessing application 325 may include functionalities that utilize automated operations in using the temporary access. For example, the accessing application 325 may access the user profile 150 via the contact center network 115 and the communications network 110 and provide services based upon information included in the user profile 150. In a second example, the accessing application 325 may include functionalities that allow the agents using the agent devices 120-130 to utilize the temporary access. For example, the accessing application 325 may provide an indication to one of the agent devices 120-130 that indicates that the contact center 112 currently has a valid temporary access for the user profile 150 and provide services based upon information included in the user profile 150. Once the accessing application 235 receives an indication from the monitoring application 230 that the temporary access is no longer valid, the access to the user profile 150 may be stopped.

Upon accessing the user profile 150, the contact center 112 via the accessing device 140, an automated service device (not shown), and/or the agent devices 120-130 may provide a variety of different services. In fact, the services may be provisioned in optimizing recommendations based on the details and information of the user profile 150. In a first example of the services, specialized treatment may be provided when the user profile 150 is accessible by the contact center 112 such as a reduced wait time in resolution of a transaction (e.g., 10 minute response time to an email transaction versus a 1 day response time). In a second example of services, the contact center 112 may provide increased caller satisfaction through a first call resolution. In a third example of services, the access to the user profile 150 for the contact center 112 may be dynamic and adaptive to the situational context. In a fourth example of services, the contact center 112 may be retained to provide contact services. Specifically, for the social networking website, the user may arrange for the contact center 112 to provide responses (e.g., preselected responses or as provided by an agent) to friends who attempt to contact the user via the social networking website when the user is out of contact such as in an airport and/or in flight. In a fifth example of services, particularly when the profile entity 155 is a social media network website, the contact center 112 may provide interaction with a messaging application, post pictures push specials/alerts based upon the user profile 150, suggest or promote recommendations based upon the user profile 150, etc.

It should be noted that the temporary access may be formatted in a variety of ways. For example, the temporary access may be a feature of the user profile arrangement. That is, the user profile arrangement may include an option in which the temporary and/or criteria basis may be utilized in enabling a third party such as the contact center 112 from accessing the user profile 150. In another example, the temporary access may be a feature that is programmed to meet the different formats for enabling access to the user profile 150 based upon that used by the user profile arrangement. Specifically, with the social networking website, the temporary access may be set such that a friend status is awarded to the contact center when the temporary access is valid but is also set such that the friend status is revoked upon the temporary access being invalid. These functionalities may be performed based upon the operations utilized in the user profile arrangement.

It should also be noted that the user profile 150 being accessed may be adapted for the temporary access. The above description indicates that the user profile 150 may be accessed but the temporary access being a specialized form of accessing the user profile 150 may entail a different set of information (e.g., a subset of the otherwise available information) to become accessed. It should further be noted that the exemplary embodiments may have settings or restrictions in which the accessor accessing the user profile 150 is placed under. For example, although the exemplary embodiments avoid the requirement to permanently share the user profile 150, privacy regulations may be placed or observed such as not duplicating the information of the user profile 150 on internal customer databases.

Figure 4:
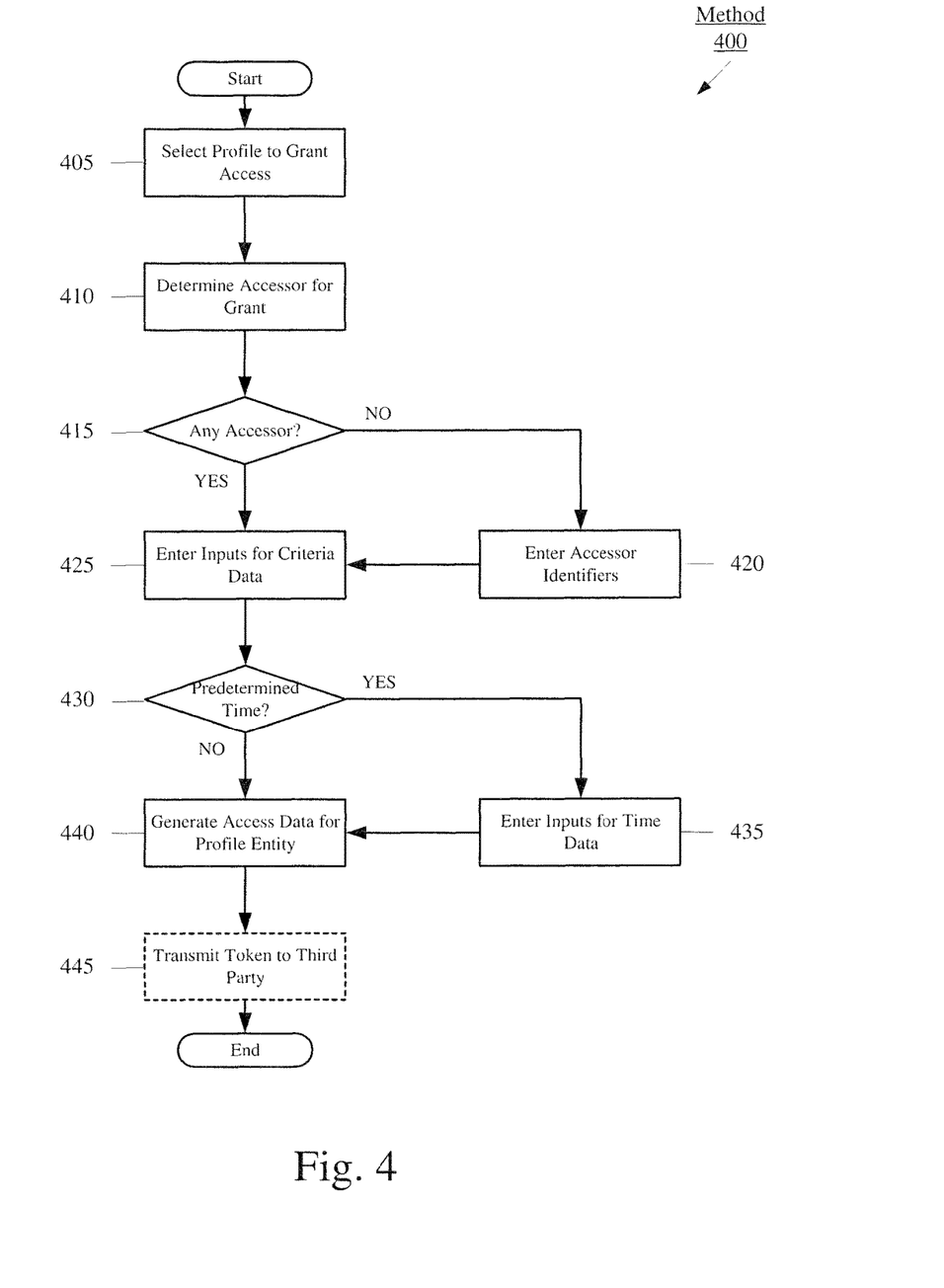
FIG. 4 shows an exemplary method for providing temporary access to a user profile according to the present disclosure.

FIG. 4 shows an exemplary embodiment of a method 400 for providing temporary access to the user profile 150 according to the present disclosure. Specifically, the method 400 may relate to the first aspect of the exemplary embodiments. Accordingly, the method 400 may further relate to operations and functionalities performed by the user device 105. The method 400 will be described with regard to the system 100 of FIG. 1 and the user device 105 of FIG. 2.

In step 405, the user device 105 selects a profile to grant access. Specifically, the user device 105 may select the source for which the user profile 150 is associated. That is, the profile entity 155 may be selected. As described above, there may be a variety of sources in which the user profile 150 may be used. For example, the user profile 150 may be associated with a social networking website, an organization, an entity, etc. Thus, the temporary access may be associated with the corresponding user profile 150 which may be accessed. In the specific example where the profile entity 155 is a social network website, the user may log into the website to constructively select the user profile 150.

In step 410, the user device 105 determines an accessor or at least one accessor in which the temporary access for the selected user profile 150 enables access. Specifically, the user may determine who is to be allowed access to the user profile 150 using this mechanism. For example, the user may select the contact center 112 to be used with the temporary access. That is, the user may manually select a particular accessor that may use the temporary access. In another example, the user may select any qualifying accessor that may use the temporary access where the qualification may be based upon meeting a set of criteria associated with the temporary access. In a further example, the user may indirectly select the third party such as providing an initial authorization (e.g., "liked" status).

In step 415, the user device 105 determines whether the temporary access is intended for any accessor or selected one or more accessors. If the temporary access is generated for selected accessors, the user device 105 continues the method 400 to step 420. In step 420, the user enters the identifiers for the accessors via the I/O device 220. However, if the temporary access is generated for any accessor, the user device 105 continues the method 400 to step 425. Accordingly, the accessor may be any user or entity that satisfies the criteria for the temporary access. In step 425, the user enters the criteria data for the temporary access. As discussed above, the criteria data may be location based, commonality based, etc.

In step 430, the user device 105 determines whether the temporary access is associated with a predetermined/preset time period or an open-ended time period. If the temporary access is generated for a predetermined time, the user device 105 continues the method 400 to step 435. In step 435, the user enters the inputs for the time data including the predetermined start time and the predetermined end time. However, if the temporary access is generated for an open-ended time period, the user device 105 continues the method 400 to step 440. Accordingly, the open-ended time period may be defined based upon whenever the criteria data is satisfied. In step 440, the user device 105 generates the access data via the grant application 240. Thus, in step 445, the user device 105 transmits the access data to the profile entity 155 via the transceiver.

It is noted that the method 400 that is performed by the user device 105 may include further steps, particularly in regard to providing the access data to the contact center 112. For example, the user device 105 may also transmit the access data to the contact center 112, particularly when the user device 105 is in a communication with the contact center 112. The user device 105 may further generate the access data for the contact center by including the identifier of the profile entity 155 as was determined when the user device 105 selected the user profile 150 for which the temporary access is to be used.

Figure 5:
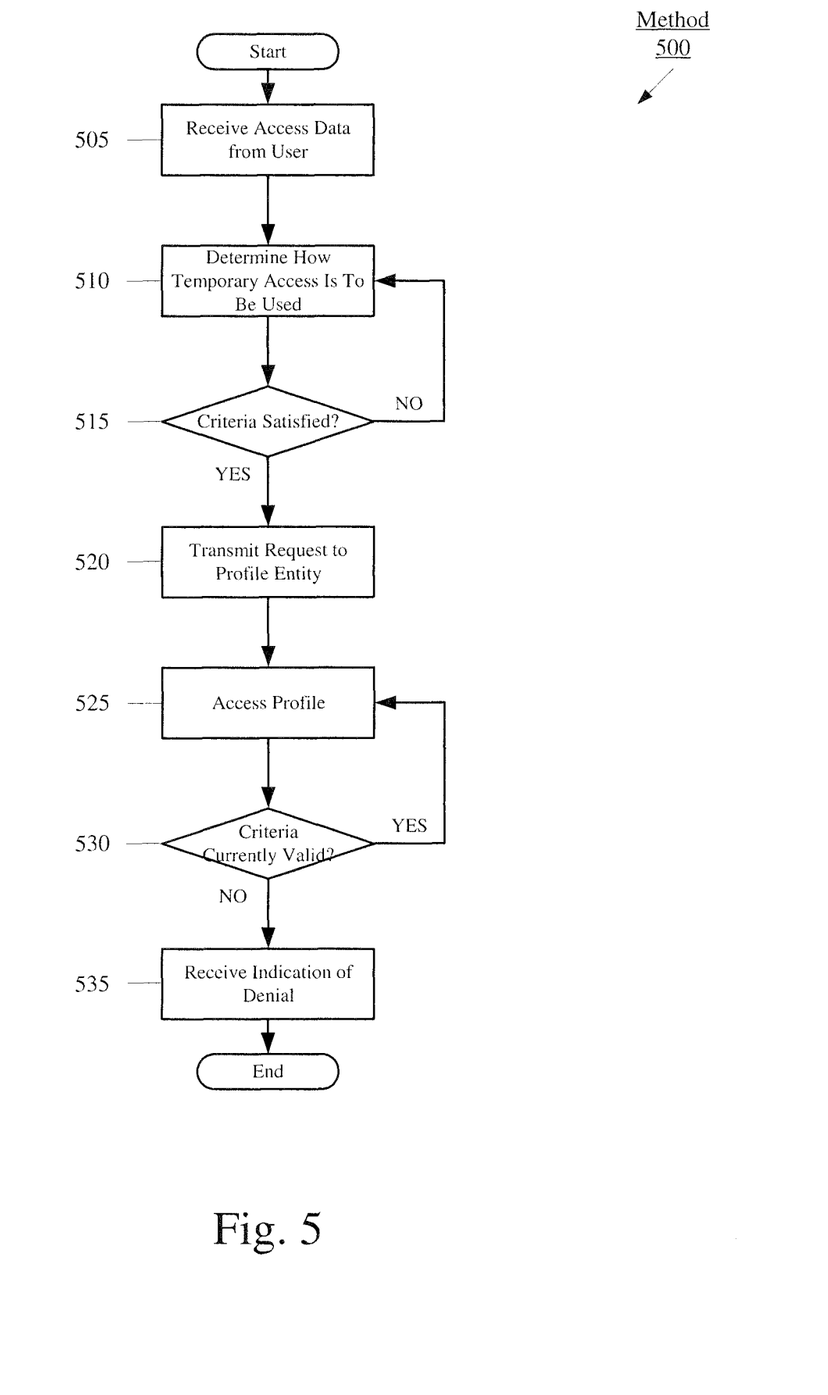
FIG. 5 shows a first exemplary method for accessing a user profile according to the present disclosure.

FIG. 5 shows a first exemplary embodiment of a method 500 for accessing the user profile 150 according to the present disclosure. Specifically, the method 500 may relate to the second aspect of the exemplary embodiments. More specifically, the method 500 may relate to when the second aspect utilizes a criteria basis upon which the temporary access is determined to be valid. Accordingly, the method 500 may further relate to operations and functionalities performed by the accessing device 140 (or in another exemplary embodiment, the intermediary entity 160 such as a broker entity). The method 500 relates specifically to when the access data has been received from the user device 105. The method 500 will be described with regard to the system 100 of FIG. 1, the user device 105 of FIG. 2, and the accessing device 140 of FIG. 3.

In step 505, the accessing device 140 receives the access data from the user device 105. As discussed above, the access data may include various types of information. For example, the access data may include a user identifier of the user using the user device 105, a third party identifier identifying the profile entity 155 that has the user profile 150 of the user, and the user-predefined conditions (e.g., criteria data) that must be satisfied for the user profile 150 to be temporarily accessible by the contact center 112. In step 510, the accessing device 140 determines how the temporary access is to be used. Specifically, the accessing device 140 may extract the above described information.

In step 515, the accessing device 140 determines whether the one or more criteria as defined in the access data is satisfied. For example, the criteria may be location based criteria, commonality based criteria, time based criteria, etc. If the one or more criteria is satisfied, the accessing device 150 continues the method 500 to step 520 where a request is transmitted to the profile entity 155. The accessing device 150 may be aware of the profile entity 155 via the third party identifier included in the access data. Thus, in the case where the profile entity 155 is a website, the accessing device 150 may connect to the website.

In step 525, the accessing device 140 accesses the user profile 150. It is noted that the request that was received by the profile entity 155 may prompt the determination whether a subsequent access is to be allowed. Thus, the profile entity 155 may determine a validity of the temporary access by the accessing device 140 based upon the access data received from the user device 105. The profile entity 155 may also determine which accessors are allowed to access the user profile 150 in this manner from the information provided in the access data. Thus, if the accessing device 140 (or the contact center 112) is included or a general accessor permission is included, the access by the accessing device 140 may be permitted by the profile entity 155. In step 530, the accessing device 140 determines whether the one or more criteria is still being satisfied. If still satisfied, the accessing device 140 may continue to access the user profile 150. However, if no longer satisfied, the accessing device 140 may cease the access of the user profile 150. If the accessing device 140 continues to attempt to access the user profile 150 with criteria not being satisfied, in step 535, the accessing device receives an indication of a denial to access the user profile 150.

Figure 6:
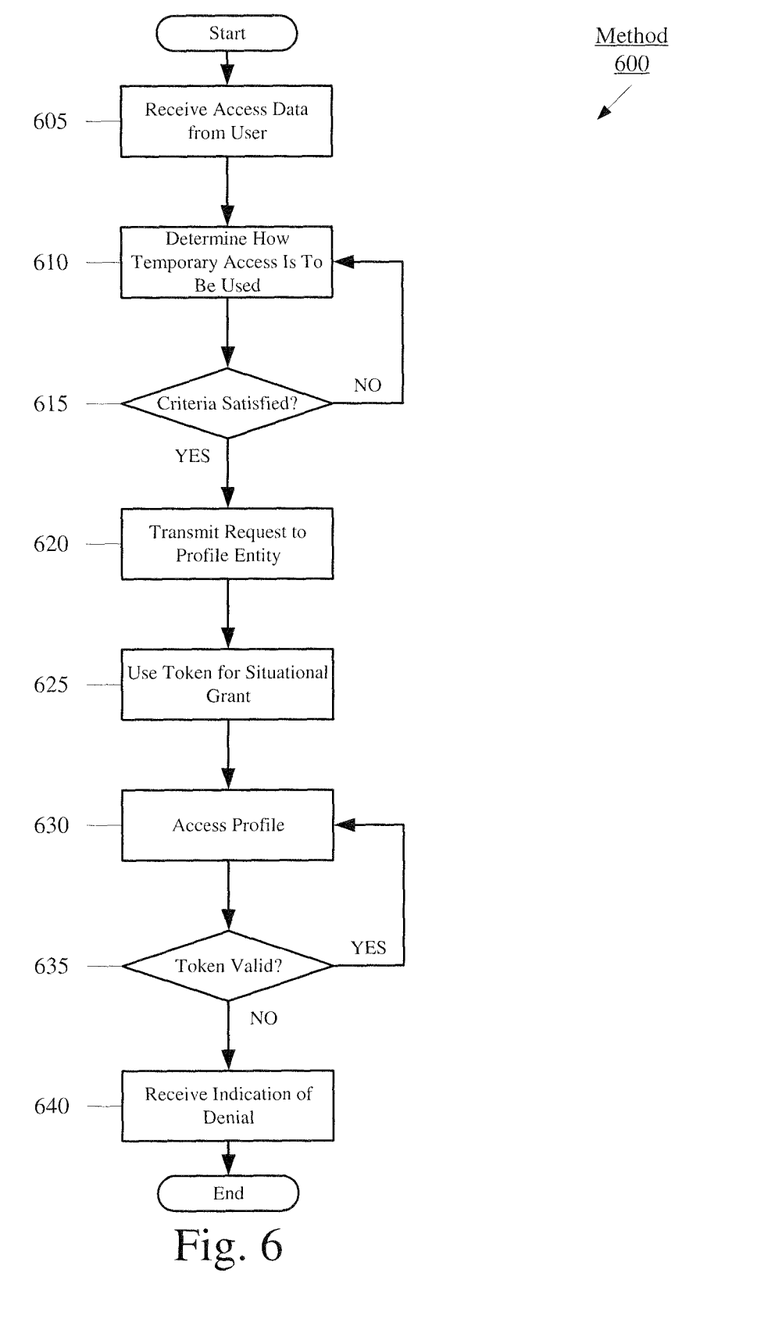
FIG. 6 shows a second exemplary method for accessing a user profile according to the present disclosure.

FIG. 6 shows a second exemplary embodiment of a method 600 for accessing the user profile 150 according to the present disclosure. Specifically, the method 600 may relate to the second aspect of the exemplary embodiments. More specifically, the method 600 may relate to when the second aspect utilizes a token for the temporary access to the user profile 150. Accordingly, the method 600 may further relate to operations and functionalities performed by the accessing device 140 (or in another exemplary embodiment, the intermediary entity 160 such as a broker entity). The method 600 relates specifically to when the access data has been received from the user device 105. The method 600 will be described with regard to the system 100 of FIG. 1, the user device 105 of FIG. 2, and the accessing device 140 of FIG. 3.

The manner in which steps 605-620 are performed may be substantially similar to steps 505-520 of the method 500 of FIG. 5. Thus, in step 505, the accessing device 140 receives the access data from the user device 105; in step 510, the accessing device 140 determines how the temporary access is to be used; in step 515, the accessing device 140 determines whether the one or more criteria as defined in the access data is satisfied; and in step 520, a request is transmitted to the profile entity 155.

In step 625, the accessing device 140 receives a permission grant token based upon a response to the request from the profile entity 155 such that the accessing device 140 uses the received token when performing the temporary access. As discussed above, the profile entity 155 may generate the token when the profile entity 155 has determined that the criteria have been satisfied based upon the access data that was received from the user device 105. When satisfied, the profile entity 155 may provide the token to the accessing device 140 for use in the temporary access. Thus, in step 630, the accessing device 140 accesses the user profile 150 using the token. In step 635, the accessing device 140 determines whether the token is still valid. As noted above, the token may include various features such as a lifespan. Thus, the accessing device 140 may determine whether the token is still usable for the situational grant. If still valid, the accessing device 140 may continue to access the user profile 150. However, if no longer valid, the accessing device 140 may cease the access of the user profile 150. If the accessing device 140 continues to attempt to access the user profile 150 with an expired token, in step 640, the accessing device receives an indication of a denial to access the user profile 150.

The exemplary embodiments provide a device, system, and method of providing a temporary access to a user profile. The temporary access may be for an authorized accessor that meets a set of criteria to enable the access to the user profile belonging to a third party on a temporary basis. Accordingly, when the accessor determines the validity of the temporary access, the accessor may access the user profile so long as the temporary access remains valid such as within the time frame of the validity. The user associated with the user profile may define the various parameters in which the temporary access is to be used in the temporary access of the user profile.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:

receiving, by an accessing device of a contact center from a user device of a user, access data, the access data comprising a user identifier for the user, an identifier identifying a third party having profile data of the user, and a user-predefined condition which must be satisfied for the profile data to be temporarily accessible by the contact center, wherein a communication is established between the user device and an agent device of a plurality of agent devices of the contact center;

after extracting the identifier identifying the third party from the access data to make the accessing device aware of the third party, determining a route for the accessing device to access the user profile from the third party and transmitting, by the accessing device, a request to the third party to temporarily access the profile data during a time period when the condition is satisfied, the request including the user identifier; and temporarily accessing, using the accessing device, the user profile when the request is granted and providing the agent device with access to the user profile.

2. The method of claim 1, wherein the user-predefined condition is associated with a location of the user.

3. The method of claim 2, wherein the location of the user is one of a geographical location of the user, a virtual location of the user, or an intended location of the user.

4. The method of claim 1, wherein the profile data is associated with a social media network profile of the user and the third party is a social media network.

5. The method of claim 1, wherein the user-predefined condition comprises a time parameter defining a start time and an end time of the time period.

6. The method of claim 5, wherein the start time is a predetermined start time and the end time is a predetermined end time.

7. The method of claim 5, wherein the start time is a dynamically selected start time corresponding to when the communication starts and the end time is a dynamically selected end time corresponding to when the communication ends.

8. The method of claim 1, further comprising:
receiving, by the accessing device, an allowance indication to temporarily access the profile data from the third party.

9. The method of claim 1, further comprising:
receiving, by the accessing device, an allowance indication to temporarily access the profile data from an intermediary entity, the intermediary entity having a preexisting relationship with the third party.

10. A method, comprising:
receiving, by a computing device from a user device of a user, access data comprising a user-predefined condition which must be satisfied for profile data to be temporarily accessible by an accessor;
after receiving the access data, storing, by the computing device in a data repository, the user-predefined condition;
receiving, by the computing device from an accessing device of the accessor, request data comprising a user identifier for the user and a request to temporarily access the profile data of the user by the accessor, wherein the accessor comprises a contact center and a communication channel is established between the user device and an agent device of a plurality of agent device of the contact center;
determining, by the computing device, if the user-predefined condition is satisfied during a time period to allow the temporary access to the profile data of the user by the accessor; and
when the user predefined condition is satisfied, providing, by the computing device to the agent device via the accessing device, the temporary access to the profile data during the time period.

11. The method of claim 10, wherein the computing device is associated with a third party and wherein the data repository is associated with the third party.

12. The method of claim 11, wherein the profile data is associated with a social media network profile of the user and wherein the third party is a social media network.

13. The method of claim 10, wherein the user-predefined condition is associated with a location of the user.

14. The method of claim 13, wherein the location of the user is one of a geographical location of the user, a virtual location of the user, or an intended location of the user.

15. The method of claim 10, wherein the user-predefined condition comprises a time parameter defining a start time and an end time of the time period.

16. The method of claim 15, wherein the start time is a predetermined start time and the end time is a predetermined end time.

17. The method of claim 15, wherein the start time is a dynamically selected start time corresponding to when the communication starts and the end time is a dynamically selected end time corresponding to when the communication ends.

18. A method, comprising:
receiving, by an accessing device of a contact center from a user device of a user, access data, the access data comprising a user identifier for the user, an identifier identifying a third party having profile data of the user, and a user-predefined condition which must be satisfied for the profile data to be temporarily accessibly by the contact center, wherein a communication channel is established between the user device and an agent device of a plurality of agent devices of the contact center;
after extracting the identifier identifying the third party from the access data to make the accessing device aware of the third party, determining a route for the accessing device to access the user profile from the third party and transmitting, by the accessing device, a request to the third party for a permission grant token to temporarily access the profile data during a time period when the condition is satisfied, the request including the user identifier;
receiving, using the access device, a response to the request from the third party, the response including the permission grant token to access the user profile during the time period; and
with the permission grant token, temporarily accessing, using the access device, the user profile and providing the agent device with access to the user profile.

19. The method of claim 18, wherein the permission grant token has a lifespan defining a duration of the time period.

* * * * *